(12) United States Patent
Bathurst

(10) Patent No.: US 10,819,500 B2
(45) Date of Patent: *Oct. 27, 2020

(54) METHOD FOR CONFIGURING AN INFRARED AUDIO TRANSMISSION SYSTEM AND APPARATUS FOR USING IT

(71) Applicant: TELEVIC CONFERENCE NV, Izegem (BE)

(72) Inventor: M. Tracy Alan Bathurst, South Jordan, UT (US)

(73) Assignee: TELEVIC CONFERENCE NV, Izegem (BE)

(*) Notice: Subject to any disclaimer, the term of this patent is extended or adjusted under 35 U.S.C. 154(b) by 0 days.

This patent is subject to a terminal disclaimer.

(21) Appl. No.: 16/406,959

(22) Filed: May 8, 2019

(65) Prior Publication Data

US 2019/0268132 A1    Aug. 29, 2019

Related U.S. Application Data

(63) Continuation of application No. 15/565,153, filed as application No. PCT/US2016/026368 on Apr. 7, 2016, now Pat. No. 10,291,387.

(30) Foreign Application Priority Data

Apr. 7, 2015 (EP) ..................................... 15162665

(51) Int. Cl.
*H04B 10/08* (2006.01)
*H04L 7/00* (2006.01)
(Continued)

(52) U.S. Cl.
CPC ....... *H04L 7/0075* (2013.01); *H04B 10/0775* (2013.01); *H04B 10/1149* (2013.01); *H04L 7/0041* (2013.01)

(58) Field of Classification Search
CPC . H04L 7/0075; H04L 7/0041; H04B 10/0775; H04B 10/1149
(Continued)

(56) References Cited

U.S. PATENT DOCUMENTS

| 5,297,144 A | 3/1994 | Gilbert et al. |
| 10,291,387 B2 * | 5/2019 | Bathurst ............... H04L 7/0041 |

(Continued)

FOREIGN PATENT DOCUMENTS

| CN | 101465910 A | 6/2009 |
| CN | 103905876 A | 7/2014 |

(Continued)

OTHER PUBLICATIONS

Office Action from Japanese Patent Application No. 2017-552943, dated Dec. 10, 2019.
(Continued)

*Primary Examiner* — Mohammad R Sedighian

(57) ABSTRACT

Disclosed is a method for determining respective transmission delays between a node and a plurality of radiators of an infrared audio transmission system comprising a signal generator and said plurality of radiators connected to said signal generator by a network, the method comprising, at a node of said network, transmitting at least one test signal to said plurality of radiators over said network, detecting an event triggered by said at least one test signal, and determining respective transmission delays between said node and said radiators on the basis of said event. Also disclosed are non-transitory computer program product comprising code means configured to cause a processor to carry out the method, a configuration node for carrying out the method, and a system comprising the configuration node and the plurality of radiators.

20 Claims, 3 Drawing Sheets

(51) Int. Cl.
  *H04B 10/114* (2013.01)
  *H04B 10/077* (2013.01)
(58) Field of Classification Search
  USPC .......................................................... 398/16
  See application file for complete search history.

(56) References Cited

U.S. PATENT DOCUMENTS

2007/0121955 A1* 5/2007 Johnston ................ H04S 7/301
  381/56
2012/0050456 A1 3/2012 Arnao et al.
2014/0321860 A1 10/2014 Kido et al.

FOREIGN PATENT DOCUMENTS

| | | |
|---|---|---|
| CN | 103905880 A | 7/2014 |
| EP | 0196347 A1 | 10/1986 |
| JP | 2000332690 A | 11/2000 |
| JP | 2006157271 A | 6/2006 |
| KR | 20120030615 A | 3/2012 |
| WO | 9515624 | 6/1995 |

OTHER PUBLICATIONS

Extended European Search Report for Application No. 15162665.2 (filed Apr. 7, 2015), dated Oct. 10, 2015.
International Search Report and Written Opinion of the International Searching Authority from PCT Application PCT/US2016/026368 (filed Apr. 7, 2016), dated Jul. 20, 2016.
Office Action from Chinese application No. 201680020691.9, dated Sep. 24, 2019.

* cited by examiner

METHOD FOR CONFIGURING AN INFRARED AUDIO TRANSMISSION SYSTEM AND APPARATUS FOR USING IT

CROSS-REFERENCE TO RELATED APPLICATIONS

This application is a continuation of, and hereby incorporates by reference for all purposes the entire contents of, co-pending U.S. patent application Ser. No. 15/565,153, which was filed on Oct. 7, 2017. U.S. patent application Ser. No. 15/565,153 is a National Stage Entry of PCT Application No. PCT/US16/26368, which was filed on Apr. 7, 2016 and claims the benefit of and the priority to European patent application EP 15 162 665, which was filed in the European Patent Office on Apr. 7, 2015.

The entire contents of PCT Application No. PCT/US16/26368 and European patent application EP 15 162 665 are hereby incorporated by reference for all purposes, including all tables, figures, and claims, and including an incorporation of any element or part of the description, claims, or drawings not contained herein and referred to in Rule 20.5(a) of the PCT, pursuant to Rule 4.18 of the PCT.

FIELD OF THE INVENTION

The present invention pertains to methods and systems for transmitting audio signals over frequency modulated infrared bands. Such systems are used for example at conferences, exhibitions, guided tours, and the like.

BACKGROUND

DE 2431937 A1 in the name of Sennheiser Electronic KG describes the use of multi-channel infrared transmission of audio feeds in different languages from interpreters at a conference to receivers in headsets worn by conference delegates.

International standard IEC 61603-7, entitled "Transmission systems of audio and/or video and related signals using infra-red radiation—Part 7: Digital audio signals for conference and similar applications," describes the characteristics of a digital multiple channel, multiple carrier audio transmission system as an extension to conference interpretation or similar systems using the frequency ranges 45 kHz to 1 MHz and 2 MHz to 6 MHz.

Known systems include a signal generator, sometimes referred to as the transmitter, which provides a modulated signal to one or more radiators. The radiators transmit the signals supplied by the signal generator as an optical signal, in particular in the form of infrared radiation. In order to cover large spaces with an adequate infrared signal, multiple radiators have to be used. Radiators are typically connected to the signal generator m a daisy-chained configuration.

It is a disadvantage of the known systems that, when multiple radiators are used, these radiators must be manually configured to introduce an artificial delay so as to synchronize the infrared signal of the different radiators, with different positions in the daisy-chain. Manual configuration of a radiator requires access to the radiator's control panel, which is difficult to reach once the radiator is mounted in its operational position (usually at great height on a wall).

It is a purpose of embodiments of the present invention to at least partially avoid this disadvantage.

SUMMARY

According to an aspect of the present invention, there is provided a method for configuring an infrared audio transmission system comprising a signal generator and a plurality of radiators connected to the signal generator by a network, the method comprising at at least one of the plurality of radiators receiving a delay compensation configuration message over the network, and storing an amount of delay to be introduced into subsequently radiated signals in accordance with the received delay compensation configuration message.

It is an advantage of the invention that manual configuration of the radiators can be avoided.

In an embodiment, the method according to the present invention further comprises, at a node of the network, transmitting at least one test signal to the plurality of radiators over the network; detecting an event triggered by the at least one test signal, and determining respective transmission delays between the node and the radiators on the basis of the event, the respective transmission delays being included in the delay compensation configuration message.

It is an advantage of this embodiment that the delay compensation values don't have to be estimated or calculated by a technician, but can be automatically determined on the basis of an automated signal-response analysis.

In a particular embodiment, the detecting of the event comprises detecting a response transmitted by at least one of the plurality of radiators.

In this embodiment, the radiators include logic that recognize the test signal, and send a predetermined response within a certain delay after receiving the test signal.

In a particular embodiment, the detecting of the event comprises detecting reflections of the at least one test signal.

It is an advantage of this embodiment that the radiators don't have to actively respond to the test signal, which could introduce a variable additional delay. Instead, a change of impedance in the transmission medium, which is present at the transmission line/radiator interface, causes a partial reflection of the electromagnetic test signal, which reflection can be detected and timed to determine the amount of delay of the tested segment by means of known time-domain reflectometry techniques.

In a particular embodiment, the radiators are connected to the network in a daisy-chain or ring architecture by means of respective network interfaces, and the method further comprises selectively changing an impedance of the respective network interfaces prior to the transmitting of the at least one test signal.

It is an advantage of this embodiment that the delay of the various segments can be more accurately determined, by measuring reflections in consecutive steps.

In an embodiment of the method according to the present invention, the radiators are connected to the network in a daisy-chain architecture by means of respective upstream and downstream network interfaces, and the method further comprises: deactivating the downstream interfaces at all of the radiators prior to the transmitting of the at least one test signal; activating the respective downstream interface of a first one of the radiators after a predetermined time following receipt of a first test signal; activating the respective downstream interface of subsequent ones of the radiators after a predetermined time following receipt of a subsequent test signal; and at each one of the radiators, deriving a relative position of the one of the radiators in the daisy-chain from a total time lapsed until receipt of the respective test signal.

It is an advantage of this embodiment that the delay of the various segments can be more accurately determined, by measuring the segments in consecutive steps. Additionally, this embodiment allows the radiators to determine their respective positions in the chain. This effect can advantageously be obtained even in situations where there is no communication from the radiators to the signal generator (i.e., no uplink). Given that the radiators know their respective positions, the delay configuration message(s) can be formatted in a simplified way; it suffices that the required delay compensation values are provided for the various positions in the chain.

In an embodiment, the method according to the present invention further comprises at the plurality of radiators: transmitting infrared signals representing a set of audio channels, the infrared signals being delayed by the stored amount of delay.

This embodiment includes the operational stage of the radiators' functioning.

According to an aspect of the present invention, there is provided a computer program product comprising code means configured to cause a processor to carry out the method as described above.

According to an aspect of the present invention, there is provided a configuration node for configuring radiators in an infrared audio transmission system connected to the configuration node by a network, the configuration node being configured to: transmit at least one test signal to the plurality of radiators over the network; detect events triggered by the at least one test signal; determine respective transmission delays between the node and the radiators on the basis of the reflections; and transmit a delay compensation configuration message over the network, the respective transmission delays being included in the delay compensation configuration message.

In an embodiment, the configuration node according to the present invention is further configured to adapt the transmission delays to be transmitted in the delay compensation configuration message to combine the effect of a plurality of branches of radiators in respective daisy-chain configurations.

This embodiment is based on the insight of the inventors that measured delay lines per branch need to be combined to obtain the overall delay line measurement. It is an advantage of this embodiment that by merging the delay measurement for different daisy-chained branches, the radiators within each branch are not only synchronized between themselves, but also relative to the radiators in other branches.

According to an aspect of the present invention, there is provided a radiator for use in an infrared audio transmission system comprising a signal generator connectable to the radiator by a network, the radiator being configured to: receive a delay compensation configuration message over the network; and store an amount of delay to be introduced into subsequently radiated signals in accordance with the received delay compensation configuration message.

Disclosed herein are a method for determining respective transmission delays between a node and a plurality of radiators of an infrared audio transmission system comprising a signal generator and said plurality of radiators connected to said signal generator by a network, and a non-transitory computer program product comprising code means configured to cause a processor to carry out the method. In some embodiments, the method comprises said node transmitting at least one test signal to said plurality of radiators over said network, said node detecting an event triggered by said at least one test signal, and said node determining the respective transmission delays between said node and said plurality of radiators on the basis of said event.

In some embodiments, said detecting of said event comprises detecting reflections of said at least one test signal. In some such embodiments, said plurality of radiators is connected to said network in a daisy-chain or ring architecture by means of respective network interfaces, and wherein the method further comprises at least one of said plurality of radiators selectively changing an impedance of its respective network interface prior to said transmitting of said at least one test signal. In some such embodiments, the method comprises each of said plurality of radiators selectively changing an impedance of its respective network interface prior to said transmitting of said at least one test signal.

In some embodiments, said detecting of said event comprises detecting a response transmitted by at least one of said plurality of radiators.

In some embodiments, said plurality of radiators is connected to said network in a daisy-chain architecture by respective downstream network interfaces, and the method further comprises deactivating the downstream network interfaces at all of said plurality of radiators prior to said transmitting of said at least one test signal, activating the respective downstream network interface of a first one of said plurality of radiators after a predetermined time following receipt of a first test signal of the at least one test signal, activating the respective downstream network interface of subsequent ones of said plurality of radiators after a predetermined time following receipt of a respective subsequent test signal, and at each one of said plurality of radiators, deriving a relative position of said one of said plurality of radiators in said daisy-chain from a total time lapsed until receipt of the respective subsequent test signal.

In some embodiments, the determined transmission delay between said node and a particular radiator of said plurality of radiators is included in a delay compensation configuration message received by said particular radiator over said network. In some such embodiments, an amount of delay is introduced into signals radiated by said particular radiator after receipt of said delay compensation configuration message, said amount of delay being in accordance with said received delay compensation configuration message. In some such embodiments, the method further comprises, at said particular radiator, transmitting infrared signals representing a set of audio channels, said infrared signals being delayed by said amount of delay.

Also disclosed herein is a configuration node for configuring a plurality of radiators in an infrared audio transmission system connected to said configuration node by a network, the configuration node being configured to transmit at least one test signal to said plurality of radiators over said network, detect events triggered by said at least one test signal, and determine respective transmission delays between said node and said plurality of radiators on the basis of said events.

In some embodiments, the configuration node is further configured to transmit a delay compensation configuration message over said network, said respective transmission delays being included in said delay compensation configuration message. In some such embodiments, the configuration node is further configured to adapt said transmission delays to be transmitted in said delay compensation configuration message to combine an effect of a plurality of branches of radiators in respective daisy-chain configurations.

Also disclosed herein is a system comprising a plurality of radiators and a configuration node for configuring said plurality of radiators in an infrared audio transmission system connected to said configuration node by a network.

In some embodiments, the configuration node is configured to transmit at least one test signal to said plurality of radiators over said network, detect events triggered by said at least one test signal, and determine respective transmission delays between said node and said plurality of radiators on the basis of said events.

In some embodiments of the system, each of the plurality of radiators comprises a respective network interface, and wherein each of the plurality of radiators is connected to said network in a daisy-chain or ring architecture by its respective network interface, and wherein at least one of the plurality of radiators is configured to selectively change an impedance of its respective network interface. In some such embodiments, each of the plurality of radiators is configured to selectively change an impedance of its respective network interface.

In some embodiments of the system, each of the plurality of radiators comprises a respective downstream network interface, each of the plurality of radiators is connected to said network in a daisy-chain architecture by its respective downstream network interface, and a first radiator of the plurality of radiators is configured to deactivate its downstream network interface, activate its downstream network interface after a predetermined time following receipt of a first test signal of the at least one test signal, and derive a relative position of the first radiator in said daisy-chain from a total time lapsed until receipt of the first test signal.

In some embodiments of the system, a first radiator of the plurality of radiators is further configured to receive, over said network, a delay compensation configuration message that includes the respective transmission delay between said node and the first radiator.

In some embodiments of the system, the first radiator is further configured to introduce a delay into signals radiated by the first radiator, wherein the delay is in accordance with the received delay compensation configuration message. In some such embodiments, the first radiator is further configured to transmit infrared signals representing a set of audio channels, said infrared signals being delayed by said delay.

The technical effects and advantages of embodiments of the computer program product, the configuration node, the radiator, and the system of the present invention correspond, mutatis mutandis, to those of the corresponding embodiments of the method according to the present invention.

BRIEF DESCRIPTION OF THE DRAWINGS

These and other features and advantages of embodiments of the present invention will now be described in more detail with reference to the accompanying drawings, in which.

DETAILED DESCRIPTION

Figure 1:
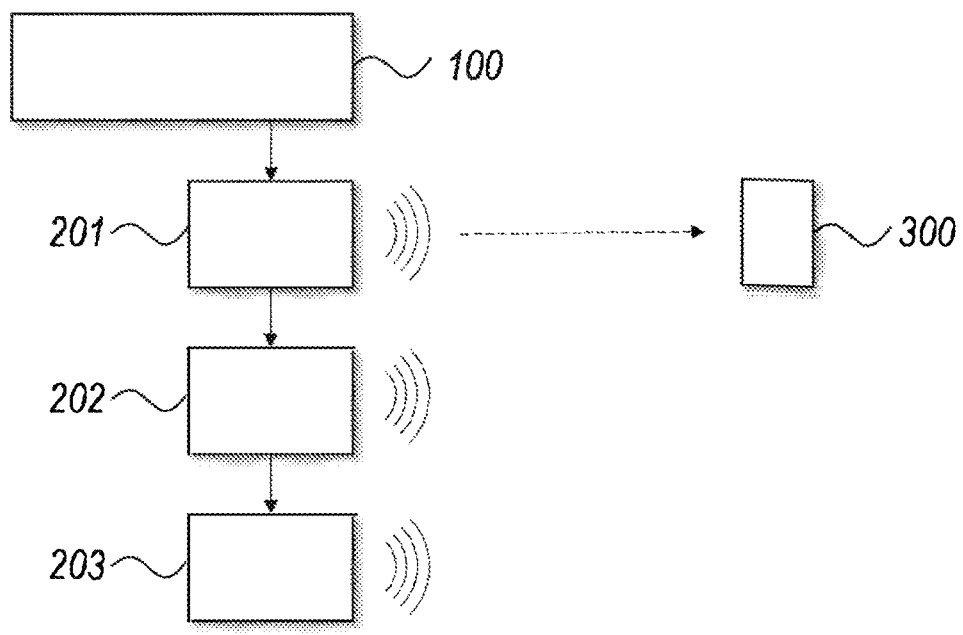
FIG. 1 schematically represents a conferencing system according to an embodiment of the present invention, the system including a signal generator, a plurality of radiators, and a plurality of receivers.

FIG. 1 schematically represents a conferencing system according to an embodiment of the present invention. The system includes a signal generator 100, sometimes referred to as the transmitter, which provides a modulated signal to one or more radiators. In order to cover large spaces with an adequate infrared signal, multiple radiators have to be used. Radiators are typically connected to the signal generator in a daisy-chained configuration; such an open chain is illustrated in FIG. 1.

Without loss of generality, three radiators 201, 202, 203 are shown in the figure. In practice, a larger number of radiators may be used, up to approximately 20. The radiators 201-203 transmit the signals supplied by the signal generator 100 as an optical signal, in particular in the form of infrared radiation. To avoid interference, the signals emitted by the various radiators have to be synchronized. This requires compensation of the delay introduced by the transmission lines connecting the various radiators in the chain. According to embodiments of the present invention, the delay compensation values may be automatically determined. According to the invention, the radiators are remotely configured with the appropriate delay compensation values.

The signal transmitted by the radiators is received by handheld receivers, carried by the conference delegates. To simplify the figure, only a single exemplary receiver 300 is shown in the figure. The illustrated receiver 300 has an infrared transceiver for receiving the audio signals that are distributed in the modulated infrared signals.

The wirelessly distributed audio signals may be audio signals such as those transmitted at conferences, exhibitions, guided tours, and the like. In particular, these may be multi-channel transmissions of the same text as translated or interpreted in different languages, modulated by means of any method (e.g., separate FM-modulated frequency bands). The channels may comprise uncompressed or compressed, analog or digital signals, and may include data, control and/or management signals in addition to the audio information.

The receiver 300 is typically a handheld device. The term handheld is used to designate a general shape, size, and weight that would allow holding the device in one's hand; this does not exclude embodiments whose design is optimized for other means of carrying, such as devices with belt clips, lanyards, bracelets, etc.

According to the invention, a plurality of audio channels are transmitted over frequency modulated infrared bands.

A configuration node according to an embodiment of the present invention may be included in the signal generator 100. The configuration node is used for configuring the radiators 201-203. The configuration node is configured to transmit at least one test signal to the plurality of radiators over the network; detect events triggered by the at least one test signal; determine respective transmission delays between the node and the radiators on the basis of the reflections; and transmit a delay compensation configuration message over the network, the respective transmission delays being included in the delay compensation configuration message.

The radiators 201-203 are configured to: receive a delay compensation configuration message over the network; and store an amount of delay to be introduced into subsequently radiated signals in accordance with the received delay compensation configuration message.

The functions of the configuration node and the radiators that pertain to the delay compensation configuration may be implemented in dedicated hardware (e.g., ASIC), configurable hardware (e.g., FPGA), programmable components (e.g., a DSP or general purpose processor with appropriate software), or any combination thereof. The same component(s) may also include other functions.

Figure 2:
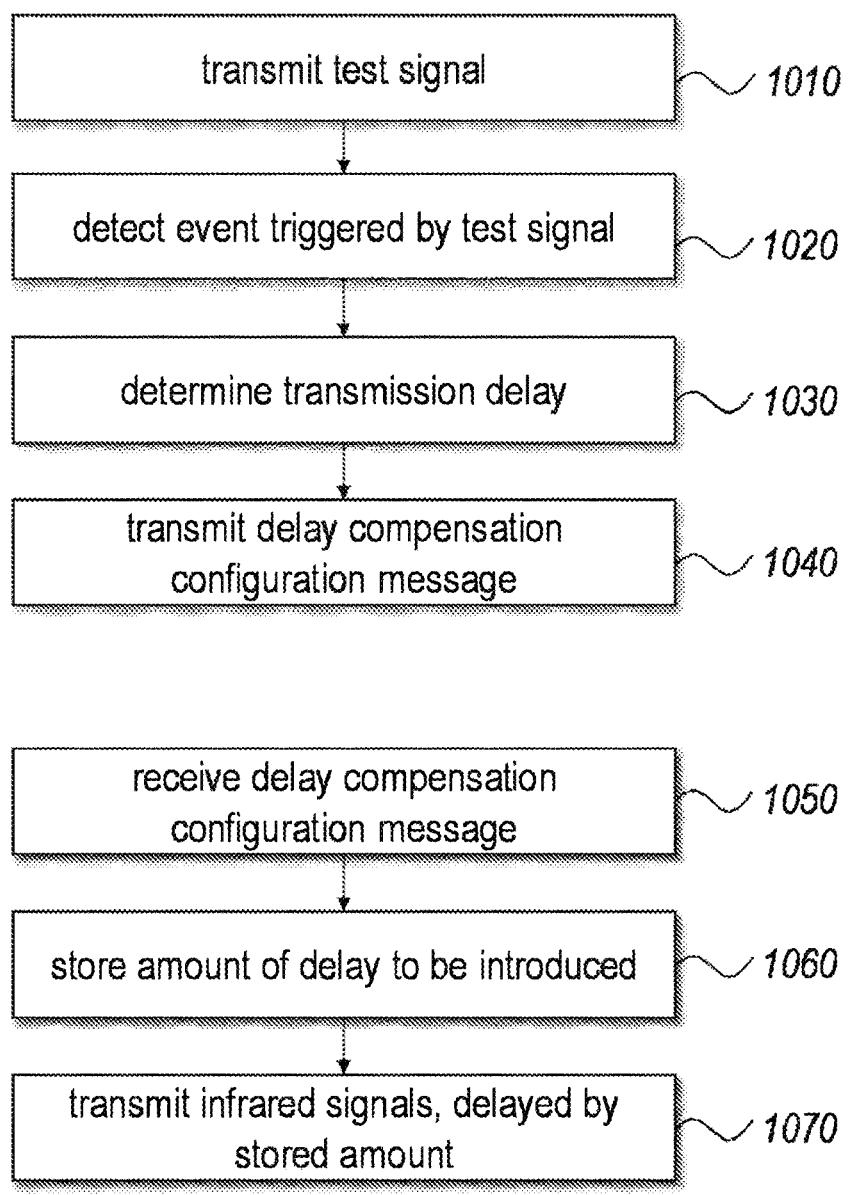
FIG. 2 provides flow charts of steps of methods according to embodiments of the present invention.

FIG. 2 provides flow charts of steps of methods according to embodiments of the present invention. The top part of the flow chart illustrates steps carried out by a configuration node, in an elementary embodiment of the present invention. In a first step 1010, the configuration node transmits a test signal. In a subsequent step 1020, the configuration node detects an event triggered by the test signal. This event may be a physical reflection of the test signal caused by a change in impedance at the location of the radiators, or a message actively transmitted by one of the radiators in response to the test message. In a third step 1030, the configuration node determines the associated transmission delay (for instance by using known time-domain reflectometry techniques) and calculates the required delay compensation values to synchronize the transmissions of the radiators. In a final step 1040, the configuration node transmits one or more delay compensation configuration messages to configure the radiators accordingly.

The bottom part of the flow chart illustrates steps carried out by a radiator, in an elementary embodiment of the present invention. In a first step 1050, the radiator receives the delay compensation configuration message described above. The amount of delay requested by that delay compensation configuration message for that particular radiator is stored in the radiator in the next step 1060. Finally, once the radiators are in normal operation mode 1070, all transmissions of infrared signals are preceded by the required compensatory delay, as previously stored.

Figure 3:
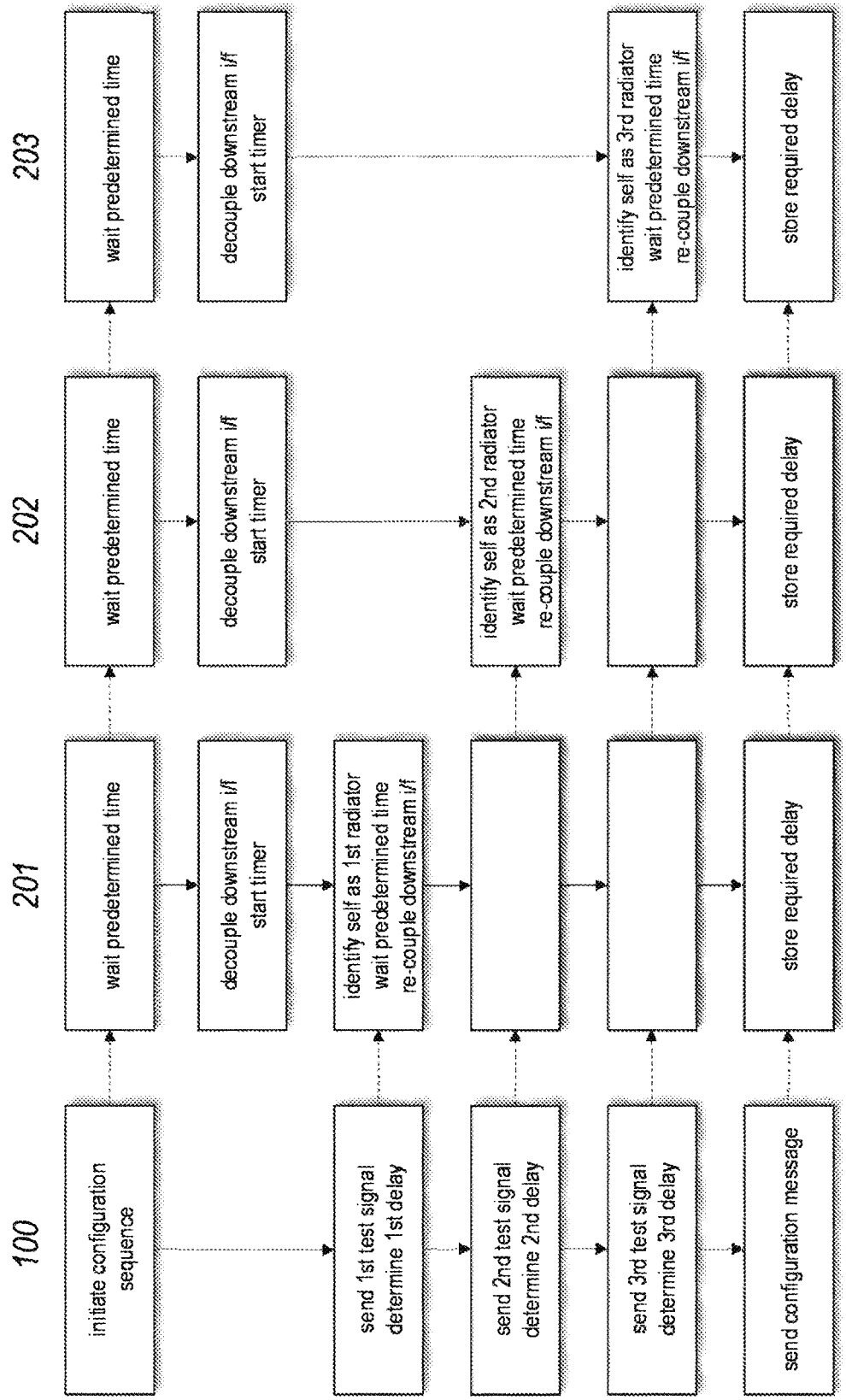
FIG. 3 provides a combined flow and signal chart representing an embodiment of the method according to the present invention.

FIG. 3 provides a combined flow and signal chart representing an embodiment of the method according to the present invention. The actions performed at different entities are shown in distinct columns. Time flows from the top of the chart to the bottom. The sequence of events is represented by solid arrows, while dotted arrows are used to indicate a message flow. The open daisy-chain topology of FIG. 1 is assumed, wherein upstream links (from one radiator to the next in the direction away from the signal generator) may be selectively disabled.

At a first stage, the configuration node 100 initiates the configuration sequence by transmitting an initial message which is transmitted along the daisy chain to radiators 201, 202, and 203. Upon receipt of this message, each radiator disconnects its downstream interface (this is preferably done after a short delay, so as to allow the initiation message to propagate). The radiators then start keeping track of time.

The initial message may be sent as a data packet, the structure of which can be recognized by the recipient, and the content of which can be parsed so as to extract an instruction to the effect that the downstream interfaces shall be disconnected and time tracking shall commence, as explained above. Additionally or alternatively, the initial message may be sent as a predetermined signal consisting of a variation of voltage levels on the line, or another recognizable modulated pattern.

At the next stage, after a first predetermined delay, the configuration node 100 transmits a first test signal, which is transmitted along the daisy chain to radiator 201 only, as all further downstream radiators have been decoupled. Radiator 201 is the only radiator that receives the first test signal within the predetermined time interval, and on this basis it can determine that it is the first radiator in the chain. Subsequently, radiator 201 reactivates its downstream interface. Radiator 201 either passively reflects or actively replies to the test signal, to allow the configuration node 100 to measure the round-trip delay, and to determine an appropriate delay compensation value accordingly.

At the next stage, after a second predetermined delay, the configuration node 100 transmits a second test signal, which is transmitted along the daisy chain to radiators 201 and 202, as all further downstream radiators have been decoupled. Radiator 202 is the only radiator that receives the second test signal as a first signal within the predetermined time interval, and on this basis it can determine that it is the second radiator in the chain. Subsequently, radiator 202 reactivates its downstream interface. Radiator 202 either passively reflects or actively replies to the test signal, to allow the configuration node 100 to measure the round-trip delay, and to determine an appropriate delay compensation value accordingly.

At the next stage, after a third predetermined delay, the configuration node 100 transmits a third test signal which is transmitted along the daisy chain to radiators 201, 202, and 203, as all further downstream radiators have been decoupled. Radiator 203 is the only radiator that receives the third test signal as a first signal within the predetermined time interval, and on this basis it can determine that it is the third radiator in the chain. Subsequently, radiator 203 reactivates its downstream interface. Radiator 203 either passively reflects or actively replies to the test signal, to allow the configuration node 100 to measure the round-trip delay, and to determine an appropriate delay compensation value accordingly.

If the configuration node 100 continues to send out test signals, it will soon notice that no new reflections/reactions are detected, and that its view of the topology of the radiators' network is therefore complete. At that point, the configuration node 100 can send the appropriate delay compensation values to the various radiators as described above, and the system can turn to normal operation.

While the invention has been described hereinabove with reference to specific embodiments, this is done to illustrate and not to limit the invention, the scope of which is defined by the accompanying claims. The skilled person will readily appreciate that different combinations of features than those described herein are possible without departing from the scope of the claimed invention.

What is claimed is:

1. A method for determining respective transmission delays between a node and a plurality of radiators of an infrared audio transmission system comprising a signal generator and said plurality of radiators connected to said signal generator by a network, the method comprising:
   said node transmitting at least one test signal to said plurality of radiators over said network;
   said node detecting an event triggered by said at least one test signal;
   said node determining the respective transmission delays between said node and said plurality of radiators on the basis of said event; and
   said node transmitting a delay compensation configuration message to a particular radiator of said plurality of radiators, the delay compensation configuration message providing information to allow the particular radiator to adjust a timing of a subsequently radiated signal.

2. The method according to claim 1, wherein said detecting of said event comprises detecting reflections of said at least one test signal.

3. The method according to claim 2, wherein said plurality of radiators is connected to said network in a daisy-chain or ring architecture by means of respective network interfaces, and wherein the method further comprises at least one of said plurality of radiators selectively changing an impedance of its respective network interface prior to said transmitting of said at least one test signal.

4. The method according to claim 3, wherein the method further comprises each of said plurality of radiators selectively changing the impedance of its respective network interface prior to said transmitting of said at least one test signal.

5. The method according to claim 1, wherein said detecting of said event comprises detecting a response transmitted by at least one of said plurality of radiators.

6. The method according to claim 1, wherein said plurality of radiators is connected to said network in a daisy-chain architecture by respective downstream network interfaces, and wherein the method further comprises:
- deactivating the downstream network interfaces at all of said plurality of radiators prior to said transmitting of said at least one test signal;
- activating the respective downstream network interface of a first one of said plurality of radiators after a predetermined time following receipt of a first test signal of the at least one test signal;
- activating the respective downstream network interface of subsequent ones of said plurality of radiators after a predetermined time following receipt of a respective subsequent test signal; and
- at each one of said plurality of radiators, deriving a relative position of said one of said plurality of radiators in said daisy-chain architecture from a total time lapsed until receipt of the respective subsequent test signal.

7. The method according to claim 1, wherein the information comprises the determined transmission delay between said node and the particular radiator.

8. The method according to claim 7, wherein an amount of delay is introduced into signals radiated by said particular radiator after receipt of said delay compensation configuration message, said amount of delay being in accordance with said received delay compensation configuration message.

9. The method according to claim 8, further comprising, at said particular radiator:
- transmitting infrared signals representing a set of audio channels, said infrared signals being delayed by said amount of delay.

10. A non-transitory computer program product comprising code means configured to cause a processor to carry out the method of claim 1.

11. A configuration node for configuring a plurality of radiators in an infrared audio transmission system connected to said configuration node by a network, the configuration node being configured to:
- transmit at least one test signal to said plurality of radiators over said network;
- detect events triggered by said at least one test signal;
- determine respective transmission delays between said configuration node and said plurality of radiators on the basis of said events; and
- transmit a delay compensation configuration message to a first radiator of said plurality of radiators, the delay compensation configuration message providing information to allow the first radiator to adjust a timing of a subsequently radiated signal.

12. The configuration node according to claim 11, wherein the information comprises a first transmission delay corresponding to the first radiator.

13. The configuration node according to claim 12, wherein the configuration node is further configured to adapt said first transmission delays to combine an effect of a plurality of branches of radiators in respective daisy-chain configurations.

14. A system comprising:
- the configuration node recited in claim 11; and
- the plurality of radiators.

15. The system recited in claim 14, wherein each of the plurality of radiators comprises a respective network interface, and wherein each of the plurality of radiators is connected to said network in a daisy-chain or ring architecture by its respective network interface, and wherein at least one of the plurality of radiators is configured to:
- selectively change an impedance of its respective network interface.

16. The system recited in claim 15, wherein each of the plurality of radiators is configured to:
- selectively change the impedance of its respective network interface.

17. The system recited in claim 14, wherein each of the plurality of radiators comprises a respective downstream network interface, and wherein each of the plurality of radiators is connected to said network in a daisy-chain architecture by its respective downstream network interface, and wherein the first radiator of the plurality of radiators is configured to:
- deactivate its downstream network interface;
- activate its downstream network interface after a predetermined time following receipt of a first test signal of the at least one test signal; and
- derive a relative position of the first radiator in said daisy-chain architecture from a total time lapsed until receipt of the first test signal.

18. The system recited in claim 14, wherein the information comprises the respective transmission delay between said configuration node and the first radiator.

19. The system recited in claim 14, wherein the first radiator is further configured to introduce a delay into signals radiated by the first radiator, wherein the delay is in accordance with the information in the delay compensation configuration message.

20. The system recited in claim 19, wherein the first radiator is further configured to transmit infrared signals representing a set of audio channels, said infrared signals being delayed by said delay.

* * * * *

UNITED STATES PATENT AND TRADEMARK OFFICE
CERTIFICATE OF CORRECTION

PATENT NO. : 10,819,500 B2
APPLICATION NO. : 16/406959
DATED : October 27, 2020
INVENTOR(S) : M. Tracy Alan Bathurst Page 1 of 1

It is certified that error appears in the above-identified patent and that said Letters Patent is hereby corrected as shown below:

In the Claims

In Column 10, Line 11, please replace "delays" with -- delay --

Signed and Sealed this
Twenty-second Day of December, 2020

Andrei Iancu
*Director of the United States Patent and Trademark Office*